US00RE47898E

(19) United States
(12) Reissued Patent
Gilson

(10) Patent Number: US RE47,898 E
(45) Date of Reissued Patent: Mar. 10, 2020

(54) BOARD FOR CARRYING A PERSON ACROSS SNOW

(71) Applicant: Gilson Boards, LLC, Winfield, PA (US)

(72) Inventor: Nicholas James Gilson, Winfield, PA (US)

(21) Appl. No.: 15/679,915

(22) Filed: Aug. 17, 2017

Related U.S. Patent Documents

Reissue of:
(64) Patent No.: 9,120,003
Issued: Sep. 1, 2015
Appl. No.: 14/462,825
Filed: Aug. 19, 2014

U.S. Applications:
(60) Provisional application No. 61/959,275, filed on Aug. 19, 2013.

(51) Int. Cl.

| | |
|---|---|
| ***A63C 5/044*** | (2006.01) |
| ***A63C 5/048*** | (2006.01) |
| ***A63C 5/056*** | (2006.01) |
| ***A63C 5/03*** | (2006.01) |
| ***A63C 5/04*** | (2006.01) |

(52) U.S. Cl.
CPC ..... *A63C 5/044* (2013.01); *A63C 5/03* (2013.01); *A63C 5/048* (2013.01); *A63C 5/0422* (2013.01); *A63C 5/056* (2013.01)

(58) Field of Classification Search
CPC ..... A63C 5/044; A63C 5/031; A63C 5/048; A63C 5/0422; A63C 5/03; A63C 5/056
USPC ..... 280/602, 608, 609
See application file for complete search history.

(56) References Cited

U.S. PATENT DOCUMENTS

| | | | | |
|---|---|---|---|---|
| 1,998,702 A | | 4/1935 | Boline | A63C 5/12 280/609 |
| 2,259,327 A | * | 10/1941 | Serr | A63C 5/0422 280/608 |
| 2,950,701 A | | 8/1960 | DeStefani | |
| 3,027,575 A | | 4/1962 | Fortin | |
| 3,077,617 A | | 2/1963 | Steffel | |
| 3,099,025 A | | 7/1963 | Thurman et al. | |
| 3,304,095 A | | 2/1967 | Carlton | A63C 5/04 280/609 |
| 3,381,972 A | | 5/1968 | Miller | |
| 3,503,621 A | | 3/1970 | Klaus et al. | |
| 3,782,744 A | * | 1/1974 | Milovich | A63C 5/0485 280/14.21 |
| 3,871,671 A | | 3/1975 | Bildner | |
| 4,083,577 A | | 4/1978 | Ford | |
| RE29,659 E | | 6/1978 | Bildner | |

(Continued)

FOREIGN PATENT DOCUMENTS

DE 3441058 A1 * 5/1986 ..... A63C 5/0411

*Primary Examiner* — Russell D Stormer
(74) *Attorney, Agent, or Firm* — Hunter Clark PLLC

(57) ABSTRACT

The disclosure herein is directed toward systems and methods for supporting a person and enabling motion of a person across a surface of snow while satisfying the countervailing requirements of increasing surface area for weight-carrying capacity on soft snow and reducing the opposing forces, like for example drag and friction, in hard snow. More specifically, a snowboard described herein includes an inner edge and an outer edge, and allows the rider to control the amount of board-to-snow contact. This snowboard is configured to improve rider support, increase speed and enhance safety performance.

15 Claims, 7 Drawing Sheets

(Amended)

(56) References Cited

U.S. PATENT DOCUMENTS 4,305,603 A * 12/1981 Muller et al. ..... 280/607
4,340,241 A 7/1982 Crocket
4,433,855 A 2/1984 Wyke
4,509,771 A 4/1985 Nussbaumer
4,524,984 A 6/1985 Axelson
4,603,870 A 8/1986 Monreal
4,608,023 A 8/1986 Williams
4,795,184 A 1/1989 Diard et al.
5,018,760 A * 5/1991 Remondet ..... A63C 5/03 280/14.24
5,052,963 A 10/1991 Johnson, III
5,301,965 A * 4/1994 Floreani ..... A63C 5/0405 280/600
5,303,949 A * 4/1994 Harper ..... A63C 5/0485 280/608
5,340,144 A 8/1994 Eleneke
5,462,304 A * 10/1995 Nyman ..... 280/609
5,580,078 A 12/1996 Vance
6,062,585 A 5/2000 Hess ..... A63C 5/048 280/608
6,193,244 B1 2/2001 Vance ..... A63C 5/03 280/14.22
6,224,085 B1 * 5/2001 Cruz ..... 280/609
6,276,699 B1 8/2001 Simmons et al.
6,382,658 B1 5/2002 Stubblefield
6,394,483 B2 5/2002 Stubblefield
6,533,625 B1 3/2003 Taylor
D473,488 S 4/2003 Mallette et al.
6,974,139 B2 12/2005 Lund
7,073,810 B2 7/2006 Wilson
7,111,864 B2 9/2006 Molg
7,219,916 B2 5/2007 Olson
7,510,206 B2 3/2009 Walker
7,841,089 B2 11/2010 Roberts et al.
7,900,950 B2 3/2011 Riepler et al.
8,020,887 B2 9/2011 Riepler et al.
8,246,070 B2 * 8/2012 Lin ..... 280/602
8,556,289 B2 10/2013 Luthardt
8,925,956 B1 * 1/2015 Harkin ..... A63C 13/003 280/604
2002/0105166 A1 8/2002 Lemieux
2003/0151215 A1 * 8/2003 Stief et al. ..... 280/14.21
2004/0100068 A1 5/2004 Restani
2004/0262885 A1 12/2004 Wilson
2005/0127638 A1 * 6/2005 Feichtlbauer et al. ..... 280/610
2005/0212261 A1 9/2005 Molg
2006/0082083 A1 * 4/2006 Olson ..... A63C 5/03 280/14.21
2006/0082089 A1 4/2006 Rejtano
2006/0097484 A1 5/2006 Walker
2006/0208459 A1 * 9/2006 Harris, Jr. ..... A63C 5/0417 280/608
2007/0205583 A1 9/2007 Schary et al.
2008/0293506 A1 11/2008 Northam
2009/0206564 A1 8/2009 Lin
2010/0171288 A1 7/2010 Nicosia et al.
2011/0204596 A1 * 8/2011 McLeod et al. ..... 280/609
2012/0032417 A1 2/2012 Mantegazza

* cited by examiner

Prior Art

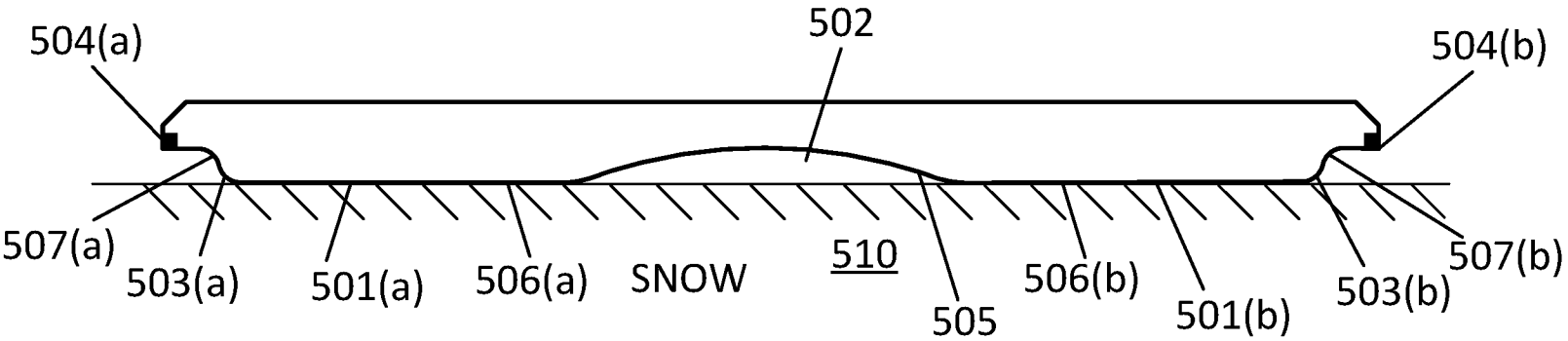
FIGURE 7
(Amended)

BOARD FOR CARRYING A PERSON ACROSS SNOW

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is an application for reissue of U.S. Pat. No. 9,120,003, which issued from U.S. application Ser. No. 14/462,825, filed Aug. 19, 2014, which* claims priority to U.S. application Ser. No. 61/959,275 entitled "Snowboard" naming Nicholas James Gilson as inventor and filed Aug. 19, 2013[, the]. *The* contents [being] *of the aforementioned, prior-filed applications are hereby* incorporated herein by reference in their [entirety] *entireties*.

TECHNICAL FIELD

The systems and methods described herein relate to sporting equipment. Specifically, snowboards and other systems and methods for enabling motion of a person across a surface of snow.

BACKGROUND

Sportsmen and engineers have designed different types of snowboards to travel over the surface of the snow. Snowboards travel differently than skis and sleds. In particular, snowboards allow users to lift up on or tilt onto an edge of the board and use the force of the board's edge against the snow surface to turn direction. This type of turning is called carving and it essentially allows the skilled snowboarder to make tight radius turns. Unlike with skis, the snowboarder positions his or her feet transverse to the longitudinal axis of the board. This means that the snowboarder must lean forward or backwards to tilt the board on to one of its edges. This takes quite a bit of skill to achieve, but the benefit is that the snowboard turns using a process that keeps the velocity of the board, both speed and direction, aligned with the turned patch of the snowboard. In contrast, turning without rising on to an edge, maintains the full wide bottom surface of the [snow board] *snowboard* against the snow [road] *and* forces the rider to essentially drag the bottom surface of the board until the [snow board] *snowboard* points in the proper direction. This manner of turning is called skidding. Skidding the board slows the rider because the frictional force of the board against the snow is not aligned with the direction of travel and therefore results in a strong frictional stopping force. Frictional forces between the board and snow surface can make riding more difficult and less fun.

Engineers and sportsmen have endeavored to reduce the frictional forces that slow and make less stable the movement of a snowboard across the snow. The interaction between the board and the snow impacts the performance of the board and rider. For example, U.S. Pat. No. 8,356,822 describes engagement devices that can attach to the bottom of a snowboard to change how it engages with the snow and performs. U.S. Pat. No. 6,193,244 discusses a snowboard having two edges on the bottom surface for contacting the snow to reduce skidding. Still there remains a need for improved systems and devices for improving and altering the performance of [snow boards] *snowboards*.

SUMMARY

Described herein are a system and method for supporting a person and enabling motion of a person across a surface of snow while satisfying the countervailing requirements of increasing surface area for weight-carrying capacity on soft snow and reducing the opposing forces, like for example drag and friction, in hard snow. More specifically, a snowboard described below includes an inner edge and an outer edge, and allows the rider to control the amount of board-to-snow contact. This snowboard is configured to improve rider support, increase speed and enhance safety performance.

In general, the system is designed to support the weight of the user and to provide motion across the surface of snow. The weight-carrying capacity of snow increases with compaction. Soft, uncompact snow has a lower weight-carrying capacity than hard, compact snow. When the weight-carrying capacity of snow is exceeded, the snow compacts until it reaches the requisite weight-carrying capacity to support the applied weight. The area of contact between the system and the snow is calculated by multiplying the width of contact between the system and the snow by the length of contact between the system and the snow. The system carries the weight of the user by transferring the weight to the snow surface across the area of contact. The maximum operating speed of the system is, in part, determined by magnitude of opposing forces that occur at the area of contact between the system and the snow surface. The opposing forces may be generated by friction, drag or other forces that oppose the primary direction of travel while the system is in use. Opposing forces have a negative impact on the maximum speed of the system.

Conventional systems are designed for use in one of either soft snow or hard snow. In soft snow, it is desirable for the weight of the user to be supported on a large area of contact between the system and the snow, [without] *with* little or no compaction required. The large area of contact places more snow under the system to support the weight of a user; it allows the user to "glide" across the surface of snow without sinking into the snow, which would increase the magnitude of opposing forces. In hard snow, it is desirable for the weight of the user to be supported on a small area of contact between the system and the snow. The small area of contact between the system and the snow reduces the magnitude of opposing forces, such as an opposing frictional force, which, in part, contributes to an increased maximum speed of the system. In the design of a conventional system, the width of contact between the system and the snow is fixed. Therefore, it is not possible to substantially increase or decrease the width of contact in response to varying snow conditions.

Consequently, many expert users carry more than one system; one wide system for soft snow conditions and one other narrow system for hard snow conditions. The soft snow system is significantly wider than the hard snow system. The increased width of the soft snow system increases the horizontal surface area, and increases the normal force supporting the user. A conventional system that is designed for soft-snow causes unnecessary drag and friction when operated on hard snow. In addition, when operating a conventional system, the user must be careful not to operate the system in a substantially flat position. A flat position is characterized by two opposing edges of the system touching the snow simultaneously. Often, the two edges are oriented perpendicular to the primary direction of travel. When the standard system is operated in a flat position, it has the potential to pitch and/or yaw, causing an edge of the system to unintentionally catch and stop in the snow, which generally results in the rider falling down. This phenomenon is sometimes called "catching an edge" and is potentially dangerous for the rider.

The snowboards described here address the countervailing requirements of increasing area for weight-carrying capacity on soft snow and reducing the opposing forces in hard snow. Moreover, these snowboards reduce the likelihood of unintentionally catching an edge in the snow. The system and methods disclosed herein support the weight of the user and enable motion at a high maximum speed on snow while satisfying the countervailing requirements of increasing weight-carrying capacity *and* reducing opposing forces. Among other features, the systems [includes] *include* a contoured lower surface that sinks lower in soft snow and rises higher in hard snow. The lower surface has at least two rails and a recessed region, which provide additional surface area for transferring weight to the snow. The amount of area contacting the snow adjusts based on, in part, the rider's speed, weight and the current snow conditions. The rails on the lower surface are sloped up toward the periphery of the system, which lifts the edges up from the snow surface and thereby reduces the likelihood of unintentionally catching an edge in the snow. More specifically, the systems and methods described herein include, among other things, snowboards having a board with an upper surface and a lower surface and a first and second end. Typically, both the first and second ends are curved upward, to lift the ends of the board off the surface of the snow, as commonly done with snowboards. The upper surface has locations for a first binding and a second binding to allow the bindings to be arranged transverse to a longitudinal axis extending through the first and second ends. The lower surface has a first and a second rail extending along the longitudinal axis and being separated by a recess extending along the longitudinal axis. The rails and the recess all have a width, as measured transverse to the longitudinal axis of the board. The width of the recess is typically, but not necessarily, greater than the width of each respective rail and the first and second rails and the recess extend across the width of the bottom surface and substantially the length of the bottom surface of the board.

Optionally, the snowboard may have first and second rails that have respective interior shoulder walls having an at least 30° inclination from an axis parallel to a beam of the board. Further optionally, the snowboard may have first and second rails *that* have a width substantially equal to one quarter the width of the bottom surface of the board. Typically, but optionally, the snowboard may have one or more bindings for gripping a boot of a rider, and the binding may be arranged to position a heel of the boot over one rail and a toe of the boot over a different rail. The snowboard may have first and second rails that have surfaces for contacting the snow, the surfaces being tapered to narrow in thickness from the recess to the peripheral edge of the board.

Optionally, when the board rests against a flat surface, the peripheral edge of the board is raised above the flat surface. The peripheral edge may be raised between about 1 mm and 8 mm above the flat surface, or any other suitable distance. In manufacture, the snowboard may have first and second rails that comprise modular bodies for being secured to the bottom surface of the board. Alternatively, the snowboard may have first and second rails that comprise rails integrally formed as part of the bottom surface of the board. Further optionally, the snowboard, under typical operating conditions, has rails with a width selected to support the weight of a user, and thereby have the recessed surface apply a force less than the weight of the user, which may include no substantial force, to the surface of the snow, such that the center of the board applies little or no force to the surface of the snow and frictional forces generated against the center of the board are reduced or eliminated.

BRIEF DESCRIPTION OF THE DRAWINGS

The foregoing and other objects and advantages of the invention will be appreciated more fully from the following further description thereof, with reference to the accompanying drawings wherein;

FIG. 7 depicts a cross-sectional view of [a] one embodiment of a snowboard as described herein.

DESCRIPTION OF THE ILLUSTRATED EMBODIMENTS

Certain illustrative embodiments will now be described, including a snowboard that supports the weight of the user and enables the user to move across the surface of snow at a high speed while satisfying the countervailing requirements of increasing weight-carrying capacity and reducing opposing forces, such as opposing frictional forces. However, it will be understood by one of ordinary skill in the art that the systems and methods described herein can be adapted and modified for other suitable applications and that such other additions and modifications will not depart from the scope hereof.

In certain embodiments, the snowboard has a bottom surface having two rails. The two rails run the length, or substantially the length, of the [snow board] *snowboard* and these two rails are separated by a recess, so that the two rails are arranged to place one along each side of the snowboard. The rails have a bottom surface that contacts the snow. Under certain operating conditions, such as when the snow is compact and firm enough to prevent or reduce the rails from sinking more than a few millimeters into the snow, the snowboard moves over the snow with the rails in contact with the snow surface and the recessed portion of the board spaced away from the compact snow surface.

Optionally, the rails may have a tapered surface. The taper may progress from the interior side of the rail adjacent to the recess toward the peripheral edge of the board. The taper spaces the peripheral edge of the board away from a flat surface on which the rails may rest. The tapered surfaces are examples of a contoured lower surface having dual rails.

Among other features, the contoured lower surface may sink lower in soft snow and ride higher in hard snow. The amount of area contacting the snow adjusts based on, in part, the rider's speed, weight and the snow conditions. The rails on the lower surface may optionally be sloped up toward the periphery of the board and may reduce the likelihood of unintentionally catching an edge in the snow, and thereby improve stability.

DETAILED DESCRIPTION

Figure 1:
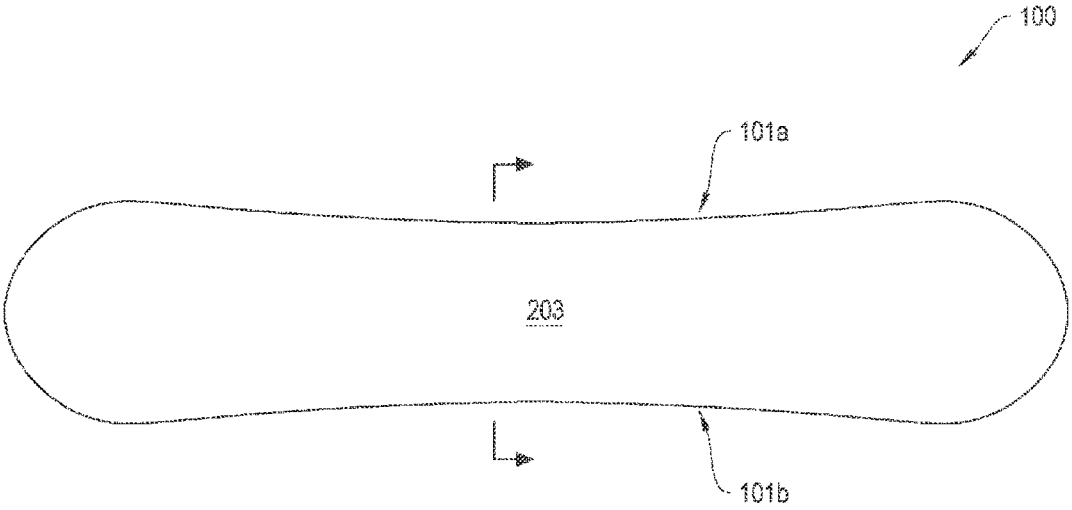
FIG. 1 depicts *a* prior art snowboard designed to support and to enable motion for a person on snow.

FIG. 1 depicts a prior art snowboard 100 designed to support the weight of a person and to enable motion on snow. The snowboard 100 contains at least one rigid element, wherein each rigid element has an upper surface (not shown), a lower surface 203 and one or more stiffened peripheral edges [101(a) and (b)] *101a and 101b*. Edges [101(a) and (b)] *101a and 101b* are located on left and right ends and, in some embodiments, may line the entire periphery of the system. Edges [101] *101a and 101b* may be made of metal, alloy or any other suitable material.

Figure 2:
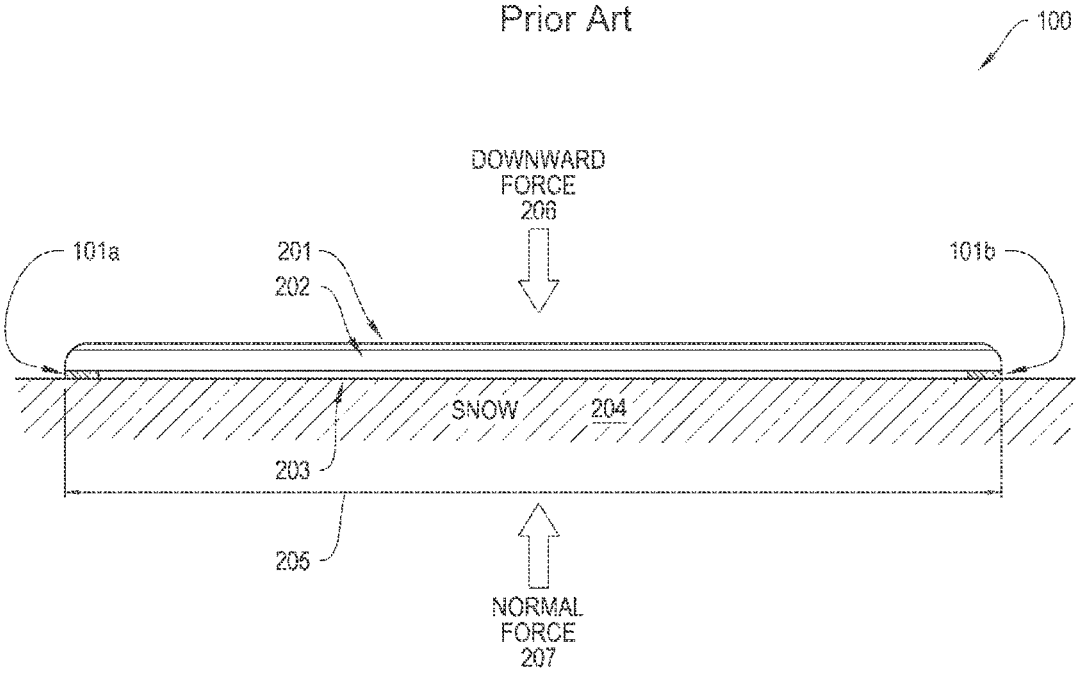
FIG. 2 depicts a cross-sectional view of a prior art snowboard.

FIG. 2 depicts a cross-sectional detail of the prior art snowboard of FIG. 1. The snowboard 100 has an upper surface 201, a lower surface 203, and a plurality of inner-layers 202 positioned between the upper surface 201 and lower surface 203. Edges [101(a) and (b)] *101a and 101b* are located on left and right ends, respectively. The lower surface 203 rests on the snow surface 204. The downward force 206 is transferred through the system 100 and is balanced by the normal force 207.

Upper surface 201 may be made of a glossy material, which serves as a medium to place graphic designs and also a UV protectant layer. Lower surface 203 is typically a polyethylene and serves to reduce friction between the bottom of the system and the surface of travel. Inner-layers 202 are made of hardwood placed in between layers of fiberglass.

During operation, the snowboard 100 reaches a physical equilibrium state wherein the normal force 207 is equal to downward force 206. The downward force 206 is determined, in part, by weight of the person on the snowboard 100. The normal force 207 is distributed across the snow 204 on an area *of* snow-to-board contact (not shown), which is determined, in part, by the width of snow-to-board contact 205. For the prior art snowboard, the width of contact 205 remains constant even as the downward force 206 increases.

Figure 3:
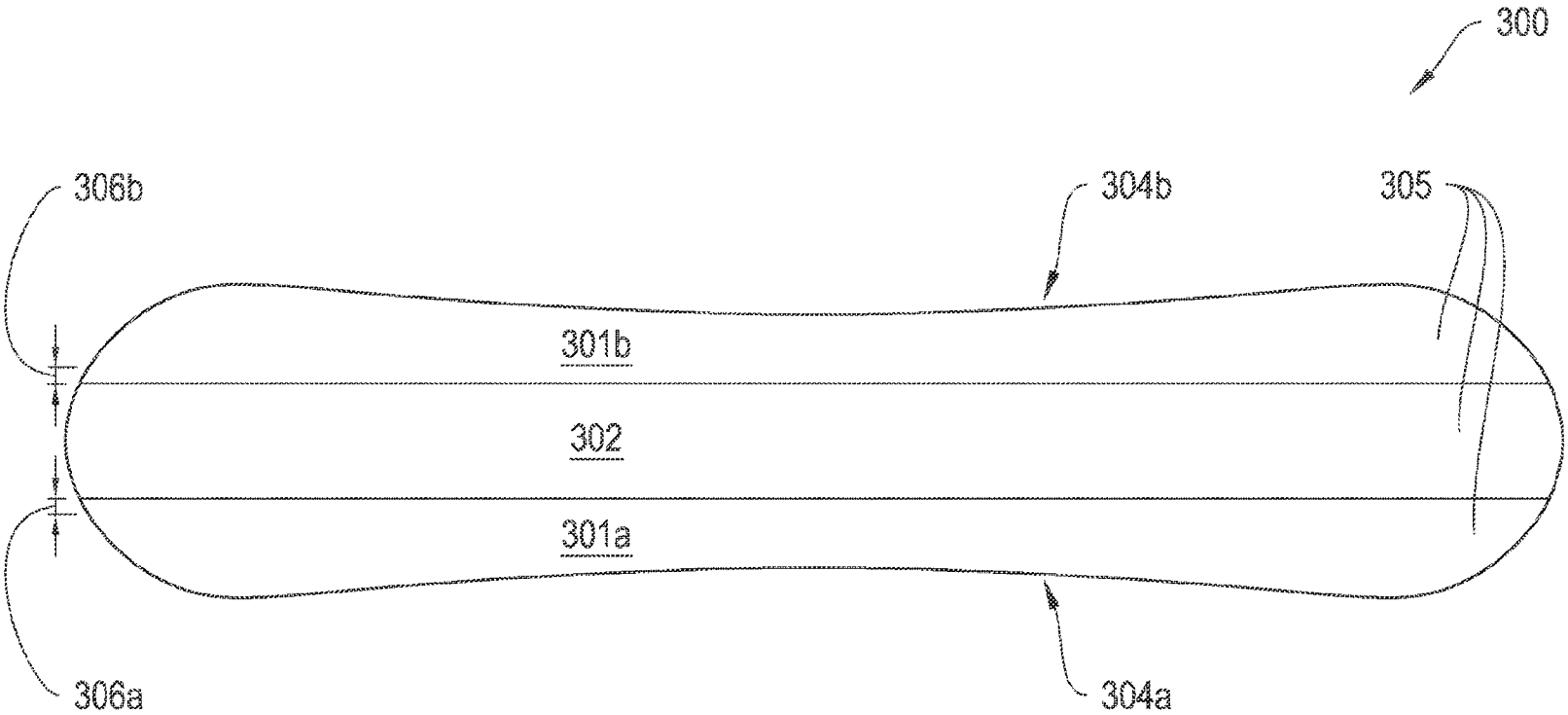
FIG. 3 depicts one embodiment of a snowboard designed to support and to enable motion for a person on snow.

FIG. 3 depicts one embodiment of the snowboards described herein. Specifically, FIG. 3 depicts the lower surface of a snowboard having two rails separated by a recess. As shown, the snowboard 300 has an upper surface (not shown), a lower surface 305, and one or more stiffened peripheral edges [304(a) and (b)] *304a and 304b*, which are located on the left side and right side of the board, respectively. The peripheral edges 304a and 304b may form a single edge that [surround] *surrounds* the full periphery of the snowboard 300. Alternatively, in other embodiments, the edges 304a and 304b are separate edges on opposing longitudinal sides of the board. The lower surface 305 is continuous across the rails [301] *301a, 301b* and a recessed region 302 is arranged between the two rails 301a and 301b. In some embodiments, the board is laminated from a series of layers. Typically the layers are wood, fiberglass and/or plastic, although other materials may be employed. These form the inner structure of the snowboard 300 and the inner layers (not shown) may be contoured in a shape that is similar to that of the lower surface 305. In other embodiments, the inner layers (not shown) may be formed as a generally flat board and the rails [301] *301a, 301b* may be distinct components of the system that are attached separately to the lower surface 305. In either case, the contour of the lower surface 305 may be similar. When in use, the system makes contact with the snow across the width of contact [306] *306a, 306b*.

Figure 4:
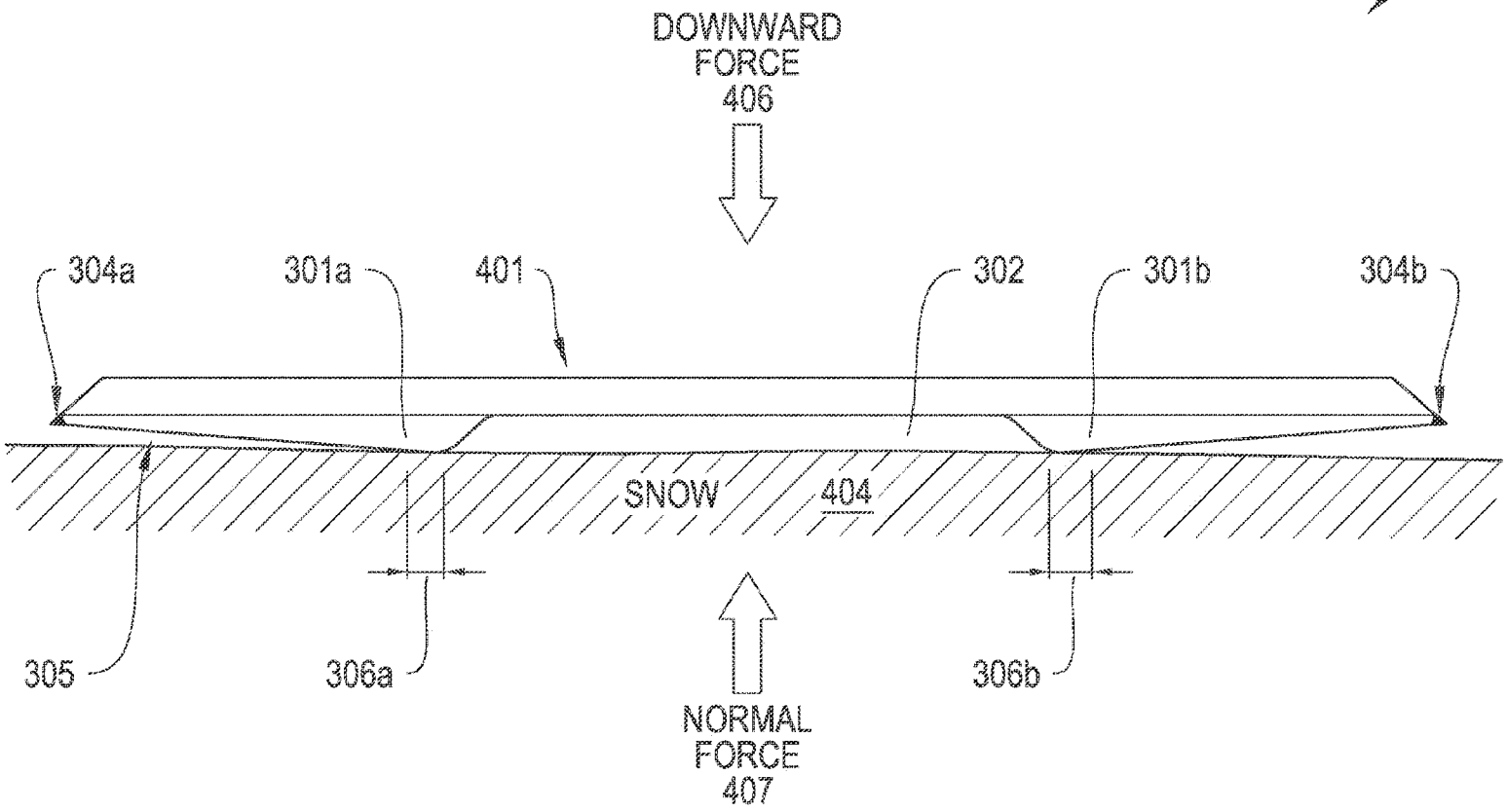
FIG. 4 depicts a cross-sectional view of one embodiment of a snowboard as described herein.

The dimensions of the snowboard [305] *300* may vary, and typically will be between 90-170 cm in length as measured along a longitudinal axis extending along the length of the [snow board 305] *snowboard 300* and between 20-30 cm in width as measured along a beam axis extending perpendicular to the longitudinal axis. The snowboard [305] *300* has a generally hourglass shape, with curved lateral sides. Typically, both the front end and the back end are curved upward to lift the ends of the snowboard off the surface of [eh] *the* snow when the lower surface 305 is placed on the snow surface. Other dimensions and shapes may be used without departing from the scope of the invention. FIG. 4 depicts a cross-sectional detail of one embodiment of the snowboards described herein. According to one embodiment, system 300 has an upper surface 401 and a lower surface 305. The lower surface 305 is continuous across the left rail [301(a)] *301a*, the recessed region 302 and the right rail [301(b)] *301b*. Stiffened peripheral edge [304(a)] *304a* and edge [304(b)] *304b* are located at the left end and right [ends] *sides*, respectively. The downward force 406 is determined, in part, by weight of the person using the snowboard. The normal force 407 is distributed across the snow 404 on an area *of* snow-to-board contact (not shown), which is determined, in part, by the width of snow-to-board contact [305] *306a, 306b*. As the downward force 406 increases, the width of contact [305] *306a, 306b* may also increase.

Likewise, as the downward force 406 decreases, the width of contact [305] *306a, 306b* may also decrease. In operation, the snowboards described herein adjust to varying snow conditions. In soft snow, the board sinks lower in the snow thereby increasing the width of contact [306] *306a, 306b*, which increases the normal force supporting the rider. In some soft snow conditions, the width of contact [306] *306a, 306b* may be large enough to include the entire width of the lower surface 305, including the surface area of rails [301] *301a, 301b* and the recessed region 302. In hard snow, the snowboard may rise toward the top of the surface and thereby decrease the area of contact [306] *306a, 306b*. In some hard snow conditions, the width of contact [306] *306a, 306b* may be small and may only include the peak of rails [301(a) and (b)] *301a and 301b* and not the surface of the recessed region 302. For conditions in between the soft and hard, the amount of board-to-snow contact varies as needed, such that the downward force 406 is equal to the normal force 407.

Turning to FIGS. 3 and 4, the rails [301] *301a, 301b* run the length of the board. Thus, the length of contact is not altered relative to the conventional design but the width of contact is decreased. By keeping the length of contact between the system and the snow constant, and by decreasing the width of contact between the system and the snow, the claimed system is able to attain higher speeds on snow than a conventional system. Not to be bound by theory, but the snowboard having the two rails on the bottom surface, may be faster than a conventional snowboard. For the same physical principles that a pair of skis is faster than a standard [snow board] *snowboard* of the same length, and a catamaran is faster than a mono-hull boat of the same length.

Also depicted in FIG. 4, the twin rails [301,] *301a, 301b* may optionally not be rectangular in shape. Instead, they [maybe] *may be* angled upwards from the peak of the rail towards the periphery of the board. Thus, the rails have a tapered surface that progresses from the interior of the board to the peripheral edge. This design feature raises the edges [304] *304a, 304b* up above the snow when the operator is initiating a turn while operating the snowboard. The raised edges allow the user to travel on width of contact [306,] *306a, 306b* without fear of unintentionally catching an edge. The result is increased comfort and, in part, safety and stability at high speeds. To initiate a carving turn, the rider must rotate the claimed system slightly further than the conventional system, ensuring that any edge-to-snow contact is intentional.

Figure 5:
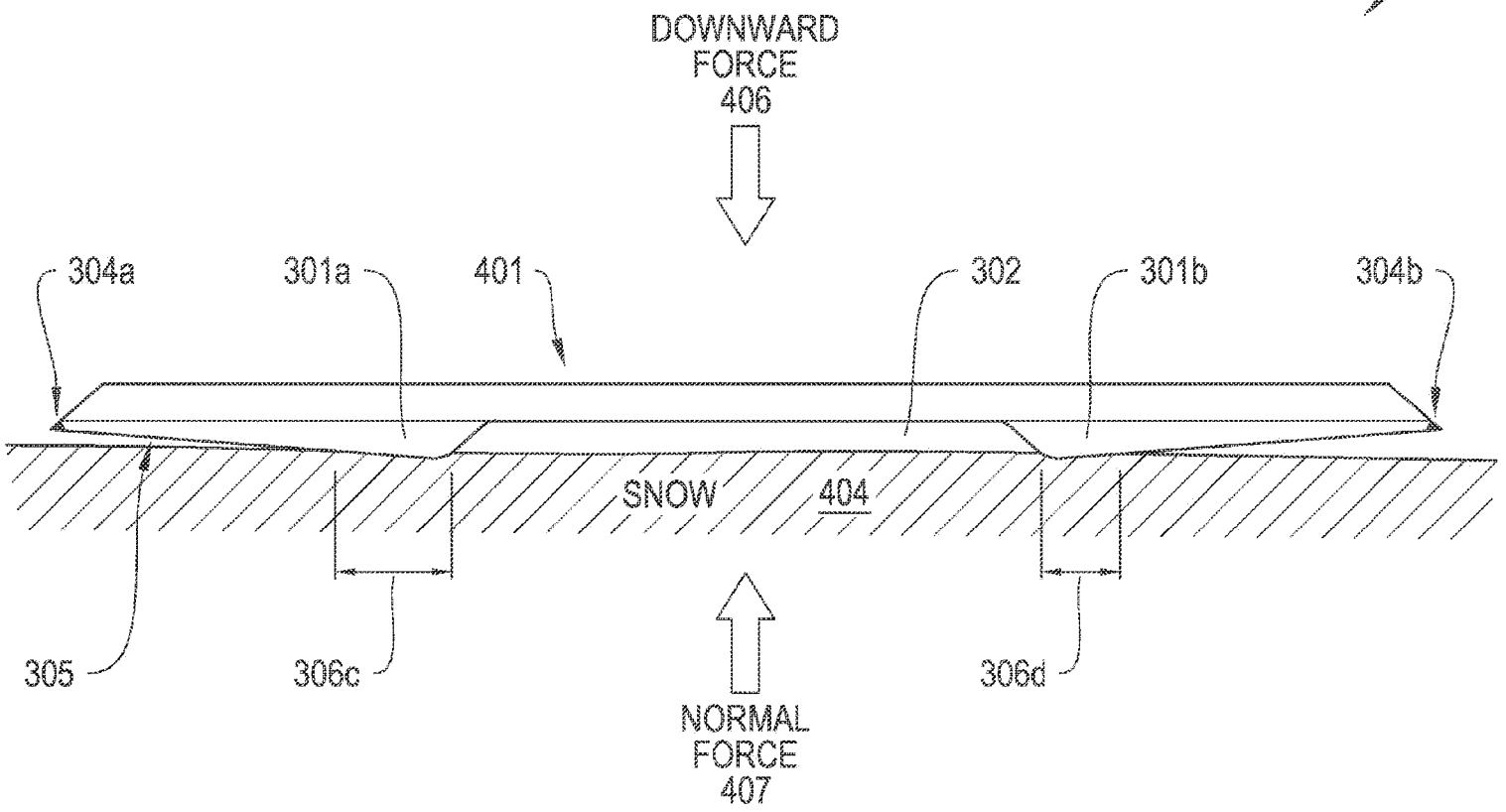
FIG. 5 depicts a cross-sectional view of a snowboard such as the snowboard in FIG. 4, and placed on a snow surface of less compact snow.

FIG. 5 depicts the snowboard of FIGS. 3 and 4 placed on a snow surface that is less firm and compact than the snow surface of FIG. 4. Specifically, FIG. [7] *5* illustrates the snowboard 300 disposed over a snow surface 404. A force 406, typically the weight of the [Rider] *rider*, pushes the snowboard 300 against the snow surface 404. In the conditions represented by FIG. 5, the rails [301(a) and 301(b)] *301a and 301b* press more deeply into the snow surface 404 than under the conditions depicted by FIG. 4. The areas of contact [306(c) and 306(d)] *306c and 306d* of the rails [301(a) and 301(b)] *301a and 301b* against the snow 404 are larger than the areas of [contract 306(a) and 306(b)] *contact 306a and 306b* depicted in FIG. 4. In still less firm conditions, the snow 404 may contact the recessed region 302 and press against the snowboard [302] *300*, at the rails [301(a) and 301(b)] *301a and 301b* and at the recessed regions.

Figure 6:
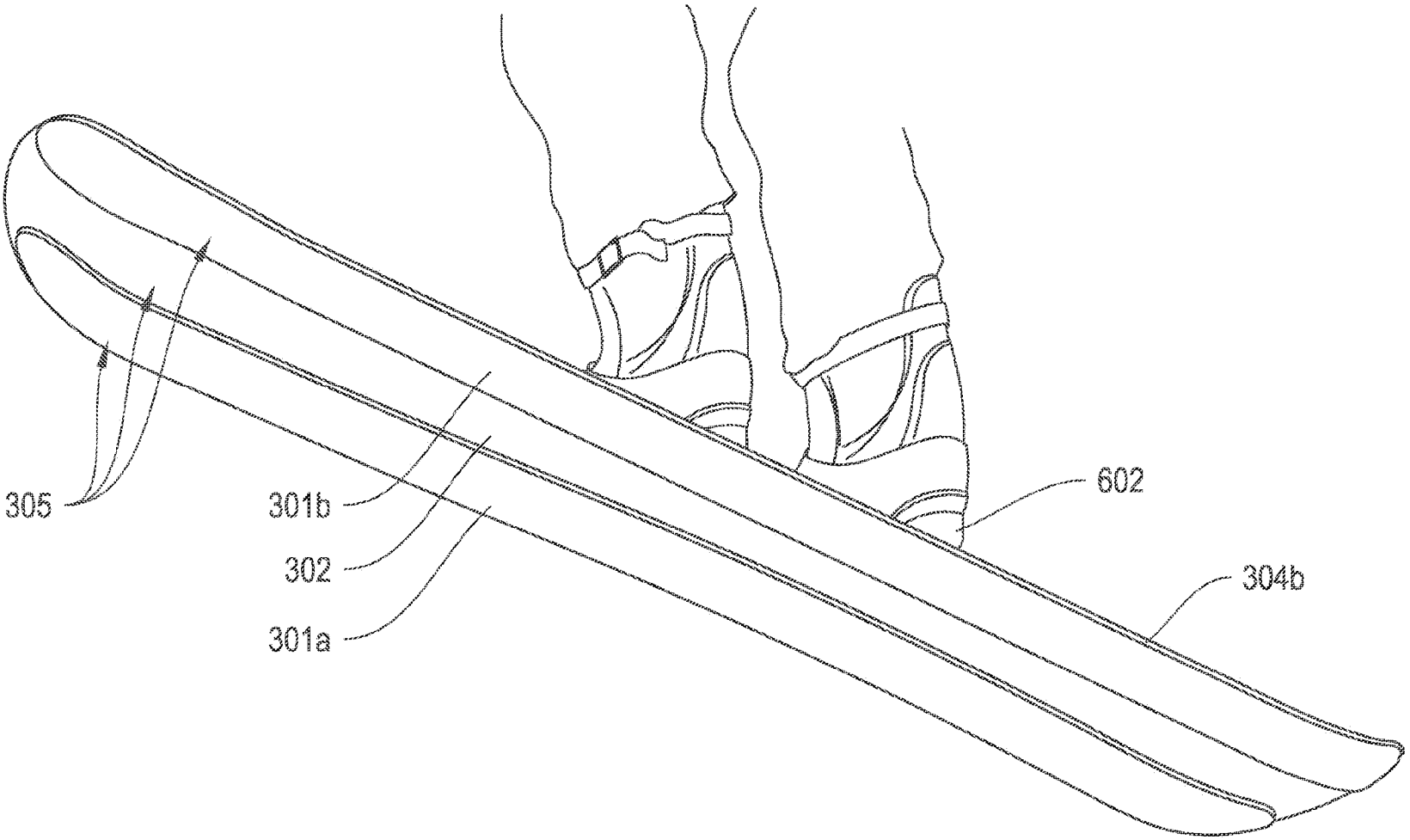
FIG. 6 depicts the lower surface of the snowboard of FIG. 3 having two rails, and partially shows a rider with bindings attached to the upper surface of the snowboard.

FIG. 6 depicts the lower surface 305 of the snowboard 300 and partially depicts binders and boots of a rider. As shown, the binders or bindings grip the rider's boot and hold the boot on the upper surface of the snowboard 300. The binding is arranged to position the heel of the boot 602 over one rail 301b and a toe of the boot (not shown) over a different rail 301a. To turn, the rider can lean forward or back to tip the snowboard 300 onto an edge [304] *304a, 304b* to carve a turn into the snow.

FIG. 7 depicts a cross-sectional detail of one embodiment of the claimed system designed to support and to enable motion for a person across a surface *of* snow. The cross section of FIG. 7 is one alternative to the cross section of FIG. 4. The lower surface 505 is continuous across the left rail 501(a), the recessed region 502, and the right rail 501(b). Edges 504(a) and 504(b) are located on the left side and right side of the board, respectively. Rails [501] *501(a), 501(b)* extend along the full length of the long axis of the board and are raised relative recessed region 502. In an alternative embodiment rails [501] *501(a), 501(b)* may only extend a portion of the length of the board. Recessed region 502 rises up to a lofted running surface, allowing the amount of surface area in contact with snow 510 to vary based on, for example, the type of snow (e.g., hard snow, soft snow), the weight of the user, the action performed by the user (e.g., slightly turning, sharply turning), the stance of the user (e.g., squatting stance, standing up straight, leaning). Inner edges 503(a) and 503(b), which form a first edge located on the lower surface of the board rise up from *surfaces 506(a), 506(b) of* rails [501] *501(a), 501(b)* up to a flat region of the lower surface of the board followed by outer edges 504(a) and [503(b)] *504(b)*. Outer edges 504(a) and 504(b) form a second edge located at a periphery of the upper surface. The first edge is thus at a different vertical location than the second edge, with the first edge being lower than the second edge as shown in FIG. 7. The first edge is also closer to the longitudinal axis than the second edge. The surface *507(a), 507(b)* of the board located between the first or inner edge and the second or outer edge is concave, such *that* this portion of the board surface is not in direct contact with the snow on the ground[, and]. Inner edges 503(a) and 503(b) form soft edges and are made of the same material as the bottom surface of the board (e.g., p-tex). Outer edges [503(a) and 503(b)] *504(a) and 504(b)* form hard edges and are made of a stiff material (e.g., metal, rigid plastic).

The combination of the inner and outer edges allows the rider or user to control the amount of board-to-snow contact. When the outer hard edges 504(a) and 504(b) engage the snow, a full carve or stop can be obtained. Having both the hard edges and the soft edges [allow] *allows* users to break contact between the snow and the hard edge which has a higher coefficient of friction, and to obtain contact between the snow and the soft edge, with a lower coefficient of friction. These inner or soft edges [503] *503(a), 503(b)* allow users to ride without catching an edge and can be used to drift, 'butter,' turn and surf the snow. When a user leans the board beyond the soft edge, the outer hard edges 504(a) and 504(b) can once again engage the snow. For experienced users, the inner edges increase the ability to perform tricks, and flat spins without engaging the outer edges. The inner edges also benefit beginning snowboarders by allowing them to learn in a more intuitive and forgiving manner, resulting in [less] *fewer* injuries.

System 500 outperforms a conventional system in acceleration, maneuverability, and versatility based, in part, on the above features. Inner edges 503(a) and 503(b) sit below and inside of outer edges [503(a) and 503(b)] *504(a) and 504(b)*. The "soft" inner edges 503(a) and 503(b) allow the rider to make small adjustments to direction without engaging the corresponding hard outer edge [503(a) or 503(b)] *504(a) and 504(b)* with the snow. In addition, inner edges 503(a) and 503(b) [allows] *allow* the rider to drift their board without catching an edge (i.e. without unintentionally engaging hard outer edge [503(a) or 503(b)] *504(a) and 504(b)*) which feels smooth to the user, much like the carve of a surfboard. When the rider chooses to turn sharply or come to a stop, they may engage the hard outer edge [503(a) or 503(b)] *504(a) and 504(b)*. When traveling on hard snow (e.g., hard-packed snow) the board (e.g., systems 300, 500) rides up on the rails thereby reducing the surface area in contact with the snow and thus reducing drag, allowing the rider to accelerate faster, and attaining higher maximum speeds. When traveling on soft snow (e.g., powder-like snow), the board sinks down slightly thereby increasing the surface area in contact with the snow and generating greater support for the user. Thus, the board enables a user to easily transition between different types of snow (e.g., hard snow, soft snow) by rising or sinking in the snow. The board performs well both as a race board (e.g., for high acceleration and speed) and in soft snow based, in part, on the variable surface area in contact with the snow. When used in a snowboard half-pipe, the board affords a user the ability to accelerate more quickly and reach high speeds faster than conventional systems, which yields improved performance (e.g., higher jumps, more time in the air after a jump to perform tricks). The design of the edges (e.g., edges [304, 503, 504] *304a, 304b, 503(a) 503(b), 504(a) 504(b)*, or the combination thereof) provides a more forgiving surface when landing tricks, similar to the reverse camber design, but it does not sacrifice "pop" like reverse camber does. Moreover, the increased acceleration rate allows a user to recover more quickly after an error than conventional systems.

The shape of the board also allows the board to be stronger and thinner than conventional snowboards. Strength and durability of the board are improved, while the board is thinner and thus lighter than standard adult snowboards. The cross-section of the board includes four sigmoid, or s-shape surfaces: between outer edge 504(a) and inner edge 503(a), between surface [501(a)] *506(a)* and recess (502), between recess (502) and surface [501(b)] *506(b)*, and between inner edge 503(b) and outer edge 504(b). These s-shaped surfaces provide sidewalls that extend orthogonally, or substantially orthogonally, to the upper surface of the board. This provides the board with a shape that increases the board's resistance to shear forces acting to crack or break the board along a line that is [traverse] *transverse* to the sidewalls. Additionally, these s-curve surfaces may act as springs, storing potential energy when the board is flexed, and causing the board to produce significant 'pop' quickly. Advantageously, the shape of the board eliminates chatter at high speeds.

The inner edges 503(a) and 503(b) are offset from the hard edges 504(a) and 504(b), respectively. Inner edges 503(a) and 503(b) may be between 8 and 11 mm closer to the board's longitudinal axis than outer edges 504(a) and 504 (b).

The thickness of the board varies both transversely, as shown in the cross-section of FIG. 7, and longitudinally. In the longitudinal direction the board is thickest where the rider's feet are located, and gradually thinner both to the left and to the right of the rider's feet, i.e. closer to the ends of the board. Accordingly, as shown in FIG. 7 the thickness varies between 1.5 mm and 6.5 mm at the longitudinal axis, and the thickness of the rails 501(a) and 501(b) varies between 3 and 8 mm.

Empirical research has shown that a board with the features described above can accelerate up to 25% faster than a standard board. Empirical research has also shown that this board is 1.5 to 2 times stronger than a standard board, and the risk of breakage is significantly reduced.

Those skilled in the art will know or be able to ascertain using no more than routine experimentation, many equivalents to the embodiments and practices described herein. For example, the claimed system and the knowledge disclosed herein may be utilized to modify or to create systems designed to carry a person or objects across a surface of water, sand, or other materials. More specific example applications may include, among other things, snowboards, water skis, wake boards, kayaks, winder surfers, or paddle boards.

The manufacture of the disclosed [snow board] *snowboard* may be accomplished employing methods that are familiar to those skilled in the art. For example, the layers of the disclosed snowboard may be constructed, in part, using a mold, which is designed having a shape consistent with the contours of the claimed system. Other example manufacturing methods may have an expandable bladder, placed in an enclosure with the layers of the system and the mold. As the bladder expands, it applies pressure to the layers, forcing them against the mold and imparting the contours of the mold. In some embodiments of a manufacturing system struts, made of wood, are used to help distribute the pressure from the bladder to the layers of the system. In other embodiments of a manufacturing method, the layers of the system may be pressed together using a pneumatic press, which applies pressure to the layers, forcing them against the opposing surface of the press and imparting the contours of the claimed system.

In other embodiments, the layers of the system are attached to one another using adhesives, epoxy, or other suitable attachment systems. Those skilled in the art will know or be able to ascertain using no more than routine experimentation, many equivalents to the embodiments and practices described herein. For example, the claimed system and the knowledge disclosed herein may be utilized to modify or to create systems designed to carry a person or objects across a surface of water, sand, or other materials. More specific example applications may include, among other things, snowboards, water skis, wake boards, kayaks, winder surfers, or paddle boards.

Accordingly, it will be understood that the invention is not to be limited to the embodiments disclosed herein, but is to be understood from the following claims, which are to be interpreted as broadly as allowed under the law.

The invention claimed is:

[1. A snowboard, comprising:

a board having an upper surface and a lower surface, a first edge and a second edge, and a first and second end, the upper surface having locations for a first binding and a second binding to allow the bindings to be arranged transverse to a longitudinal axis extending through the first and second ends, the lower surface having a first and a second rail extending along the longitudinal axis and being separated by a recess extending along the longitudinal axis, the rails and the recess each having a width measured transverse to the longitudinal axis and the width of the recess being greater than the width of each respective rail, and the first and second rails and the recess extending substantially a length of the lower surface, and the second edge being located at a periphery of the upper surface, and the first edge being located on the lower surface and closer to the longitudinal axis than the second edge, wherein the first and second rails have surfaces for contacting a snow surface, the first and second rail surfaces being tapered to narrow a thickness of the respective rail from the recess to the first edge of the board.]

[2. The snowboard according to claim 1, wherein a surface of the board between the first edge and the second edge is concave.]

[3. The snowboard according to claim 1, wherein the first edge is made with a first material, and the second edge is made with a second material, and wherein the second material is stiffer than the first material.]

[4. The snowboard according to claim 1, wherein when the boards rests on a flat surface the first edge is in contact with the flat surface, and the second edge is raised above the flat surface.]

[5. The snowboard according to claim 4, wherein the second edge is raised between about 1 mm and 8 mm above the flat surface.]

[6. The snowboard according to claim 1, where the first and second rails have respective interior shoulder walls having an at least 30° inclination from an axis parallel to a beam of the board.]

[7. The snowboard according to claim 1, wherein the first and second rails have a width substantially equal to one quarter the width of the lower surface.]

[8. The snowboard according to claim 1, further comprising a binding for gripping a boot of a rider, and wherein the binding is arranged to position a heel of the boot over one rail and a toe of the boot over a different rail.]

[9. The snowboard according to claim 1, wherein the first and second rails comprise modular bodies for being secured to the lower surface of the board.]

[10. The snowboard according to claim 1, wherein the first and second rails comprise rails integrally formed as part of the lower surface of the board.]

[11. The snowboard according to claim 1, wherein the width of the rails is selected to support a weight of a user, and thereby have a surface of the recess apply a force less than the weight of the user to a snow surface.]

[12. A method of manufacturing a snowboard, comprising providing a board having an upper surface and a lower surface, a first edge and a second edge, and a first and second end, arranging on the upper surface locations for a first binding and a second binding to allow the bindings to be arranged transverse to a longitudinal axis extending through the first and second ends, and forming on the lower surface a first and a second rail extending along the longitudinal axis and being separated by a recess extending along the longitudinal axis, wherein the rails and the recess each have a width measured transverse to the longitudinal axis and the width of the recess being greater than the width of each respective rail and the first and second rails and the recess extend substantially a length of the lower surface, wherein the second edge is located at a periphery of the upper surface, and the first edge is located on the lower surface and closer to the longitudinal axis than the second edge, and wherein the first and second rails have surfaces for contacting a snow surface, the first and second rail surfaces being tapered to narrow a thickness of the respective rail from the recess to the first edge of the board.]

13. [A snowboard] *An apparatus for carrying a person across a surface of snow*, comprising:

a board having an upper surface and a lower surface, [a first edge and a second edge,] and a first and second end, the upper surface having locations for a first binding and a second binding to allow the bindings to be arranged transverse to a longitudinal axis extending through the first and second ends, the lower surface having a first and a second rail extending along [the longitudinal axis] *at least a portion of a length of the board* and being separated by a recess extending along the longitudinal axis, the rails and the recess each having a width measured transverse to the longitudinal axis and the width of the recess being greater than the width of each respective rail[, and the first and second rails and the recess extending substantially a length of the lower surface], [and] *the lower surface having first edges and second edges, each of the first and second rails having a respective one of the first edges, each of the second edges disposed at a periphery of the lower surface on a respective side of the longitudinal axis, the lower surface configured such that if the first and second rails rest on a flat surface, the second edges will be displaced further from the flat surface than the first edges, and such that each first edge is a soft edge defined by a first edge portion of the lower surface that will extend away from the flat surface as the first edge portion extends away from the longitudinal axis,*

*each of* the second [edge] *edges* configured to provide engagement with a snow surface with a first coefficient of friction, *and*

*each of* the first [edge] *edges* configured to provide engagement with the snow surface with a second coefficient of friction [when the second edge is not engaged with the snow surface], wherein the second coefficient of friction is lower than the first coefficient of friction, wherein the first and second rails have *first and second rail* surfaces, *respectively,* for contacting a snow surface, the first and second rail surfaces [being tapered] *each having a concave portion* to narrow a thickness of the respective rail [from the recess to] *between* the *respective* first edge *and the respective second edge* of the board.

*14. A board for carrying a person across a surface of snow, comprising*

*an upper surface and a lower surface, with a centerline extending longitudinally along a length of the board, and being sized for supporting the person traveling across the surface of snow,*

*a first and a second end, and*

*a first and a second side each of which extends between the upper surface and the lower surface,*

*the lower surface including a first snow contact surface disposed laterally from the centerline on a first side of the centerline and a second snow contact surface disposed laterally from the centerline on a second side of the centerline opposite the first side of the centerline, including first and second inner edges disposed on the first and second sides of the centerline respectively, and including first and second outer edges disposed on the first and second sides of the centerline respectively,*

*the first and second inner edges being spaced laterally away from the first and second outer edges, respectively, towards the centerline, and*

*each of the first and second outer edges being located at a respective peripheral edge of the board,*

*wherein the lower surface includes first and second s-shaped surfaces extending from the first and second snow contact surfaces to the first and second outer edges respectively, each of the first and second inner edges comprising an inner-edge portion of the first s-shaped surface and the second s-shaped surface respectively, such that a thickness of the board diminishes from the first and second snow contact surfaces toward the first and second outer edges respectively and such that if the first and second snow contact surfaces rest on a flat surface, then the first and second outer edges will be disposed further above the flat surface than the first and second inner edges, and*

*wherein the first and second snow contact surfaces comprise a first material, the first and second inner edges comprise the first material, and the first and second outer edges comprise a second material that is different from the first material.*

*15. The board of claim 14, wherein the first s-shaped surface includes a concave portion and a flat portion between the first inner edge and the first outer edge.*

*16. The board of claim 14, wherein the first outer edge comprises an outer-edge portion of the lower surface, and a portion of the first side extends from the outer-edge portion of the lower surface.*

*17. The board of claim 14, wherein the second material has a higher coefficient of friction than the first material.*

*18. The board of claim 14, wherein the second material comprises one of a metal or a rigid plastic material.*

*19. The board of claim 14 wherein the first material comprises polyethylene.*

*20. The board of claim 14, wherein the first and second s-shaped surfaces are configured such that if the first and second snow contact surfaces rest on a flat surface, then the first and second outer edges will be disposed between 1 mm and 8 mm above the flat surface.*

*21. The board of claim 14, wherein the board has an hourglass shape with the first and second sides being curved inward toward the longitudinal axis.*

*22. The board of claim 14, wherein the board comprises a snowboard or a ski.*

*23. A method of manufacturing a board for carrying a person across a surface of snow, comprising*

*forming the board to include a first and a second end, an upper surface and a lower surface, with a centerline extending longitudinally along a length of the board, and a first side and a second side each extending between the upper surface and the lower surface,*

*forming the lower surface to include a first snow contact surface disposed laterally from the centerline on a first side of the centerline and a second snow contact surface disposed laterally from the centerline on a second side of the centerline opposite the first side of the centerline, to include first and second outer edges disposed on the first and second sides of the centerline respectively and disposed at respective peripheral edges of the board, and to include first and second inner edges disposed on the first and second sides of the centerline respectively and spaced laterally away from the first and second outer edges and towards the centerline, and*

*forming the lower surface to include first and second s-shaped surfaces extending from the first and second snow contact surfaces to the first and second outer edges respectively, each of the first and second inner edges comprising an inner-edge portion of the first s-shaped surface and the second s-shaped surface respectively, such that a thickness of the board diminishes from the first and second snow contact surfaces toward the first and second outer edges respectively and such that if the first and second snow contact surfaces rest on a flat surface, then the first and second outer edges will be disposed further above the flat surface than the first and second inner edges,*

*wherein the first and second snow contact surfaces comprise a first material, the first and second inner edges comprise the first material, and the first and second outer edges comprise a second material that is different from the first material.*

*24. The method of claim 23, wherein the second material has a higher coefficient of friction than the first material.*

*25. The method of claim 23, wherein the first s-shaped surface includes a concave portion and a flat portion between the first inner edge and the first outer edge.*

*26. The method of claim 23, wherein the first and second s-shaped surfaces are formed such if with the first and second snow contact surfaces rest on a flat surface, then the first and second outer edges will be disposed between 1 mm and 8 mm above the flat surface.*

*27. The method of claim 23, wherein the board comprises a snowboard or a ski.*

* * * * *